Figure 1:
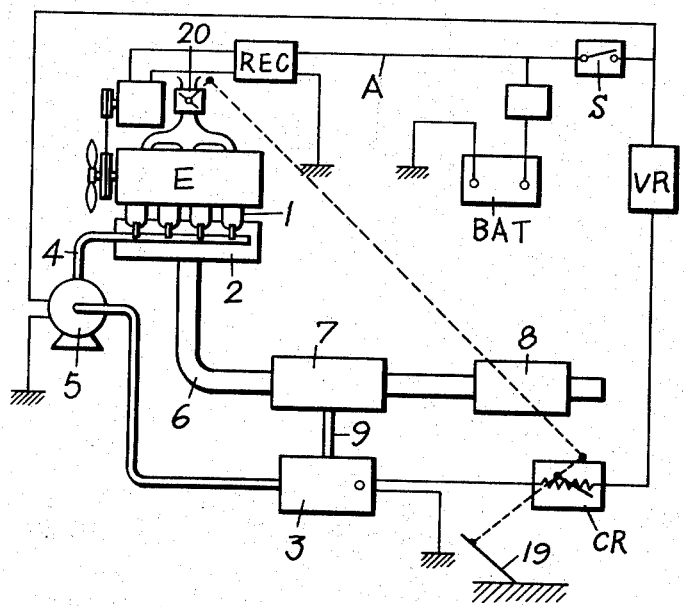

United States Patent [19]
Nohira et al.

[11] 3,779,014
[45] Dec. 18, 1973

[54] EXHAUST EMISSION CONTROL DEVICE

[75] Inventors: Hidetaka Nohira; Masaru Kokokawa, both of Susono City, Japan

[73] Assignee: Toyota Jidosha Kogyo Kabushiki Kaisha, Toyota-cho, Toyota City, Japan

[22] Filed: Oct. 14, 1971

[21] Appl. No.: 189,267

[30] Foreign Application Priority Data
May 26, 1971 Japan.............................. 46/35983

[52] U.S. Cl....................... 60/286, 23/284, 60/294, 60/309, 423/212, 423/235
[51] Int. Cl....................... F01n 3/16, F02b 75/10
[58] Field of Search................... 60/274, 275, 286, 60/303, 309, 294; 123/119 E; 423/23 E, 212, 213, 214; 23/284

[56] References Cited
UNITED STATES PATENTS

| | | | |
|---|---|---|---|
| 2,062,859 | 12/1936 | Bowen | 60/275 |
| 3,000,707 | 9/1961 | Barstow | 423/214 |
| 3,072,457 | 1/1963 | Bloch | 60/301 |
| 3,170,758 | 2/1965 | Honerkamp | 423/213 |
| 3,311,097 | 3/1967 | Mittelstaedt | 60/275 |
| 3,402,015 | 9/1968 | Hardison | 60/303 |

Primary Examiner—Douglas Hart
Attorney—Stevens et al.

[57] ABSTRACT

An exhaust emission control device comprising a hydrogen producing means, a control means for effecting control of the quantity of hydrogen produced by said hydrogen producing means in accord with the production of exhaust gases of combustion, and a hydrogen supply line for supplying hydrogen produced by said hydrogen producing means to an oxides of nitrogen reductive reaction chamber.

3 Claims, 2 Drawing Figures

EXHAUST EMISSION CONTROL DEVICE

This invention relates to an exhaust emission control device for internal combustion engines effective to reduce or remove oxides of nitrogen from exhaust gases which are discharged as a result of combustion of a fuel-air mixture.

Exhaust gases discharged from internal combustion engines, such as engines for motor vehicles, and other combustion devices which use air as an oxidizing agent generally contain therein oxides of nitrogen (hereinafter designated $NO_x$) which stimulate the eyes and nose, interfere with the growth of plants and cause the formation of photo-chemical smog. Proposals have been made to use exhaust gas recycling systems and ignition advance angle control systems to reduce or remove oxides of nitrogen. The former has disadvantages that the recycling gas line tends to corrode, and that difficulties are faced with in carrying the method into practice and, further, that the output power of the engine is reduced. The latter is not a specific remedy and can achieve no marked results.

Accordingly, an object of this invention is to provide a device which can reduce or remove oxides of nitrogen from exhaust gases by simple means without adversely affecting the performance of internal combustion engines.

Another object of the invention is to provide a device which is effective to condense the moisture content of exhaust gases and produce hydrogen without using an additive, so that oxides of nitrogen can be reduced or removed from the exhaust gases economically by simple means.

Another object of the invention is to provide a device which is effective to reduce $NO_x$ content to a fraction or entirely remove $NO_x$ from exhaust gases while the aforementioned disadvantages of the devices of the prior art are obviated.

Figure 2:
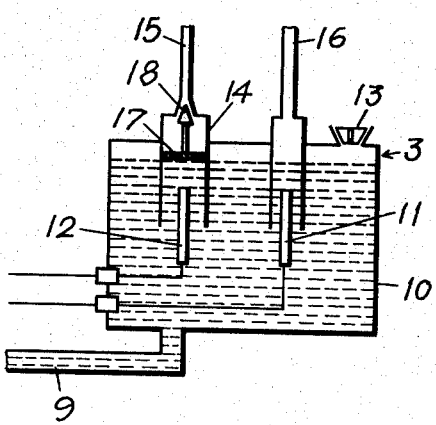

Additional objects as well as features of this invention will become evident from a description set forth hereinafter when considered in conjunction with the accompanying drawing, in which:

FIG. 1 is a view in explanation of an operation circuit of a preferred embodiment of this invention; and FIG. 2 is a view in explanation of a hydrogen producing means.

Before giving a detailed explanation of this invention, we would like to summarize in general terms the mechanism of production of oxides of nitrogen in exhaust gases of internal combustion engines and other combustion devices. In a combustion device wherein a fuel-air mixture is burned at elevated temperature under high pressure, oxygen and nitrogen which is not concerned in the combustion react with each other as expressed by the following formula to produce nitric oxide:

$$N_2 + O_2 \rightleftarrows 2NO - Q$$

(1)

Factors governing the quantity of $NO_x$ in exhaust gases discharged from the combustion device include among other factors, the maximum temperature of combustion, the quantity of excess oxygen and the time interval during which the temperature is maintained at an elevated level. When the combustion device is an internal combustion engine, there are other factors, such as the air-fuel-ratio, ignition advance, manifold pressure and the like, which are directly or indirectly concerned in the production of $NO_x$ in exhaust gases. These factors are related to the output power of the internal combustion engine, and the quantity of $NO_x$ in exhaust gases is substantially proportional to the load of the engine. That is, in the case of an automobile engine, the higher the degree to which the acceleration pedal is depressed, the greater is the $NO_x$ content of exhaust gases. About 99 percent of the $NO_x$ in the exhaust gases of a gasoline engine is in the form of nitric oxide and the remainder is in the form of nitrogen dioxide.

The results of experiments show that nitric oxide in exhaust gases reacts with hydrogen ($H_2$) with a maximum efficiency in a narrow temperature range of from 650° to 700°C as expressed by the following formula:

$$2NO + 2H_2 \rightarrow N_2 + 2H_2O$$

(2)

At the same time, reactions expressed by the following formulae take place in the aforementioned temperature range, though on a small scale:

$$2NO + 3H_2 \rightarrow 2NH_3 + O_2$$

(3)

$$2NO + 5H_2 \rightarrow 2NH_3 + 2H_2O$$

(4)

It will be seen, therefore, that, if exhaust gases are caused to react with hydrogen in the aforementioned temperature range, the nitrogen oxide in the exhaust gases can be removed.

About 97 percent of the nitrogen dioxide in exhaust gases undergoes the following reaction in the aforementioned temperature range:

$$2NO_2 \rightarrow 2NO + O_2$$

(5)

This invention is based on the aforementioned findings. According to the invention, the $NO_x$ in exhaust gases is caused to react with hydrogen and removed, with the supply of oxygen being increased as the $NO_x$ content of exhaust gases is increased so that the aforementioned reactions may take place with a maximum efficiency.

On the other hand, it is generally known that a large quantity of $H_2O$ is produced as expressed by the following formula when perfect combustion takes place in a combustion device:

$$CnHm + (4n + m/4) O_2 \rightarrow nCO_2 + (m/2) H_2O$$

(6)

Since a small quanity of $O_2$ is present in exhaust gases, the reaction expressed by the following formula takes place when $H_2$ is supplied to the exhaust gases:

$$2H_2 + O_2 \rightarrow 2H_2O$$

(7)

It will be seen that, if exhaust gases are cooled after the $NO_x$ therein is caused to undergo reductive reaction with hydrogen, a large quantity of water can be obtained by condensation. Since the water obtained in this way is acidic, it can be electrolyzed by impressing a DC voltage thereto using any additive as expressed by the following formula:

$$2H_2O \rightarrow 2H_2 + O_2$$

(8)

Thus, according to this invention, the hydrogen produced by electrolyzation of the water obtained by condensation is utilized in the reductive reaction of $NO_x$ so as to effect exhaust emission control with a maximum efficiency by a simple means.

The drawing shows the exhaust emission control device for automobile engines comprising a preferred embodiment of this invention. Exhaust ports 1 of an engine E are directly connected to a reductive reaction chamber 2. Mounted on exhaust ports 1 is a hydrogen supply line 4 which supplies hydrogen from a hydrogen producing means 3 and ejects the same against the ports. An injection pump 5 is mounted on line 4.

A cooling means 7 is mounted on an exhaust line 6 disposed on the downstream side of reductive reaction chamber 2. Exhaust gas passed through cooling means 7 is vented to atmosphere through a muffler 8.

The moisture content of exhaust gases is condensed into water as the exhaust gases are cooled, and the water produced is supplied through a line 9 to hydrogen producing means 3.

As shown in FIG. 2, hydrogen producing means 3 comprises a water tank 10 in which an anode 11 and a cathode 12 are disposed. Line 9 for supplying water produced by condensation is connected to the bottom of water tank 10, and a water supply port 13 is provided in the upper portion of tank 10. Disposed above cathode 12 is a hydrogen collector 14 which is connected through a line 15 to injection pump 5. An oxygen collector 16 is disposed above anode 11.

A check valve 18 provided with a float 17 is mounted on hydrogen collector 14 to keep the water in the tank from being drawn up.

A DC voltage is supplied through a rectifier Rec and a circuit A, B, C to anode 11 and cathode 12 in the water tank from a generator D driven by engine E, so that electrolysis can be performed. A voltage regulator VR and a current regulator CR for the hydrogen producing means are inserted in the aforementioned circuit. Current regulator CR which constitutes means for controlling the quantity of hydrogen produced is operatively connected to an acceleration pedal 19. Accordingly, current regulator CR is operatively connected to a throttle valve 20 for a carbureter. A current is also passed to anode 11 and cathode 12 through a regulator R from a battery BAT.

If the engine E is started, then a switch S is turned on and a current is passed to the anode 11 and cathode 12 of hydrogen producing means. Injection pump 5 is actuated to supply hydrogen to exhaust ports 1. The aforementioned reactions take place in reductive reaction chamber 2, with a result that the $NO_x$ in exhaust gases is removed or reduced in amount. The moisture content of exhaust gases is converted into water by condensation and returned to water tank 10 where it is subjected to electrolysis. This cycle is repeated.

The quantity of hydrogen produced may vary depending on the degree to which acceleration pedal 19 is depressed. It is thus possible to supply to the exhaust ports a quantity of hydrogen which is needed to treat the $NO_x$ produced.

While the embodiment shown and described herein uses a hydrogen producing means which relies on electrolysis of water, it is to be understood that this invention is not limited to this specific form of hydrogen producing means, and that any other suitable hydrogen producing means may be used.

From the foregoing description, it will be appreciated that this invention has effect in removing or reducing oxides of nitrogen in exhaust gases by a simple means without adversely affecting the performance of the engine. Control of the quantity of $NO_x$ can be effected in accord with the quantity thereof produced in exhaust gases. The invention can be incorporated readily in all types of combustion engines.

According to the invention, exhaust gases are cooled after the $NO_x$ therein is removed and the moisture content thereof is condensed to produce water which is electrolyzed to produce hydrogen to be used for reductive treatment of oxides of nitrogen in exhaust gases. No additive is used for treating exhaust gases to remove oxides of nitrogen therefrom, so that the device according to this invention is economical.

What is claimed is:

1. An exhaust emission control device comprising a hydrogen producing means, a control means for effecting control of the quantity of hydrogen produced by said hydrogen producing means in accord with the production of exhaust gases of combustion, and a hydrogen supply line for supplying hydrogen produced by said hydrogen producing means to an oxides of nitrogen reductive reaction chamber, said control means comprising a variable resistor connected in series to an electric circuit for applying a voltage on said hydrogen producing means, and a member connecting a slider of said variable resistor to an acceleration pedal.

2. An exhaust emission control device comprising a hydrogen producing means relying on electrolysis of water for producing hydrogen and including a hydrogen collector having mounted therein a check valve provided with a float, a control means for effecting control of the quantity of hydrogen produced by said hydrogen producing means in accord with the production of exhaust gases of combustion, a hydrogen supply line for supplying hydrogen produced by said hydrogen producing means to an oxides of nitrogen reductive reaction chamber, an exhaust gases cooling means disposed on the downstream side of said oxides of nitrogen reductive reaction chamber, and means for supplying to said hydrogen producing means water produced by condensation of the moisture content of cooled exhaust gases.

3. An exhaust emission control device as defined in claim 2 in which a DC voltage supplied from a generator driven by an engine producing said exhaust gases is applied on said hydrogen producing means relying on electrolysis of water.

* * * * *